(12) United States Patent
Taddei

(10) Patent No.: US 8,511,645 B2
(45) Date of Patent: Aug. 20, 2013

(54) ANTI-KINKING TRANSMISSION AND GUIDING SYSTEM FOR RUNNING CABLES

(75) Inventor: Franco Taddei, Cologno Monzese (IT)

(73) Assignee: CE.S.I. Centro Studi Industriali di Taddei Simona Maria & C. S.A.S., Cologno Monzese (MI) (IT)

( * ) Notice: Subject to any disclaimer, the term of this patent is extended or adjusted under 35 U.S.C. 154(b) by 30 days.

(21) Appl. No.: 13/394,794

(22) PCT Filed: Aug. 31, 2010

(86) PCT No.: PCT/IT2010/000377
§ 371 (c)(1),
(2), (4) Date: Mar. 7, 2012

(87) PCT Pub. No.: WO2011/033545
PCT Pub. Date: Mar. 24, 2011

(65) Prior Publication Data
US 2012/0168552 A1 Jul. 5, 2012

(30) Foreign Application Priority Data
Sep. 16, 2009 (IT) ................ TO2009A0706

(51) Int. Cl.
*B66D 1/36* (2006.01)
(52) U.S. Cl.
USPC ............ 254/286; 254/278; 254/280; 254/338
(58) Field of Classification Search
USPC ......... 254/278, 280, 281, 284–286, 335–338; 244/153 R; 290/55
See application file for complete search history.

(56) References Cited

U.S. PATENT DOCUMENTS

| 1,396,489 A | * | 11/1921 | Williams | 244/33 |
| 2,480,488 A | * | 8/1949 | MacClatchie | 254/397 |
| 3,779,395 A | * | 12/1973 | Dykeman | 212/81 |

(Continued)

FOREIGN PATENT DOCUMENTS

| EP | 1672214 A1 * | 6/2006 |
| FR | 2475148 A1 | 8/1981 |
| IT | TO2006A000491 A | 7/2006 |
| NL | 8503094 A | 6/1987 |

OTHER PUBLICATIONS

CE.S.I. Centro Studi Industrali di Taddei, International Search Report cited in parent International Patent Application No. PCT/IT2010/000377.

*Primary Examiner* — Emmanuel M Marcelo
*Assistant Examiner* — Michael Gallion
(74) *Attorney, Agent, or Firm* — David A. Farah; Sheldon Mak & Anderson PC

(57) ABSTRACT

An anti-kinking transmission and guiding system is described, comprising at least one first and second cable running mutually parallel along an axis (X-X) and subtended between a respective winding and unwinding system and at least one output guiding and transmission assembly of such cables, at least one anti-kinking guiding and transmission assembly of such cables being interposed between the winding and unwinding system and the output guiding and transmission assembly, such anti-kinking guiding and transmission assembly of such cables and such output guiding and transmission assembly being rotating around such rotation axis (X-X), a rotation of such anti-kinking guiding and transmission assembly around such rotation axis (X-X) being adapted to perform a winding shaped as an helical cylinder of such cables along such rotation axis (X-X) without contact or rubbing points between such cables.

7 Claims, 6 Drawing Sheets

(56) References Cited

U.S. PATENT DOCUMENTS

| | | | |
|---|---|---|---|
| 4,470,563 A * | 9/1984 | Engelsman | 244/33 |
| 4,516,033 A * | 5/1985 | Olson | 290/54 |
| 5,009,353 A * | 4/1991 | Alquist | 226/172 |
| 6,254,034 B1 * | 7/2001 | Carpenter | 244/153 R |
| 6,327,994 B1 * | 12/2001 | Labrador | 114/382 |
| 7,275,719 B2 * | 10/2007 | Olson | 244/155 A |
| 7,328,811 B2 * | 2/2008 | Roodenburg et al. | 212/252 |
| 7,504,741 B2 * | 3/2009 | Wrage et al. | 290/55 |
| 8,134,249 B2 * | 3/2012 | Ippolito et al. | 290/55 |
| 8,319,368 B2 * | 11/2012 | Ippolito et al. | 290/55 |
| 8,368,241 B2 * | 2/2013 | Toneaki | 290/44 |
| 2002/0040948 A1 * | 4/2002 | Ragner | 244/153 R |
| 2006/0287201 A1 * | 12/2006 | Georgi et al. | 507/100 |
| 2007/0120004 A1 * | 5/2007 | Olson | 244/10 |
| 2009/0097974 A1 * | 4/2009 | Ippolito et al. | 416/31 |
| 2009/0278353 A1 * | 11/2009 | Da Costa Duarte Pardal et al. | 290/44 |
| 2010/0013225 A1 * | 1/2010 | Ippolito et al. | 290/44 |
| 2011/0074161 A1 * | 3/2011 | Ippolito | 290/55 |
| 2011/0103954 A1 * | 5/2011 | Vergnano | 416/31 |

\* cited by examiner

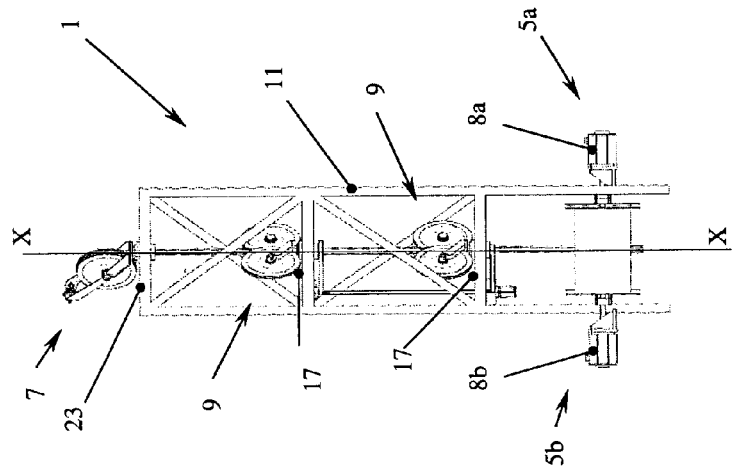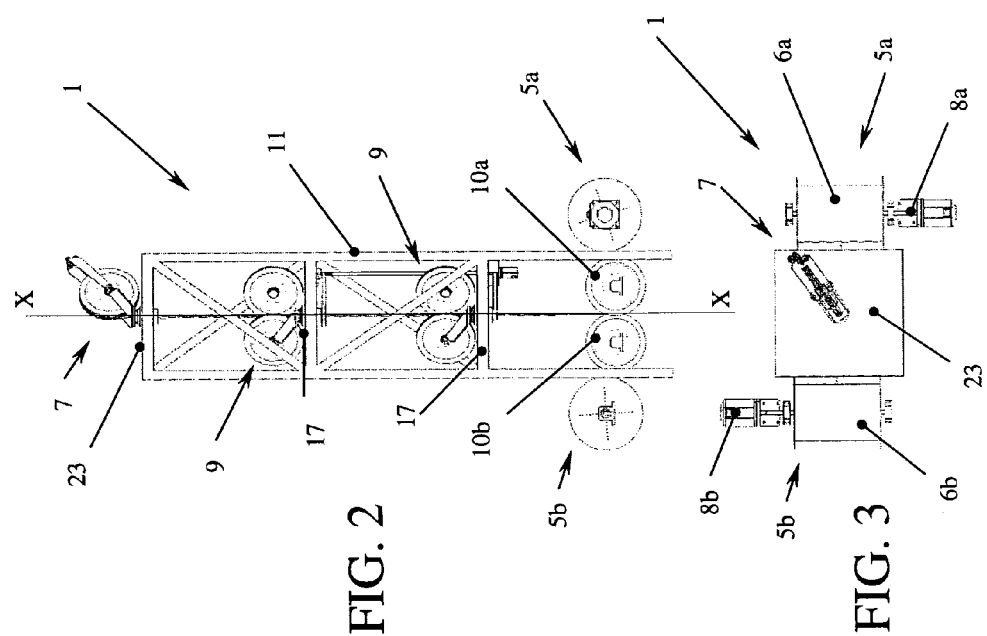

ANTI-KINKING TRANSMISSION AND GUIDING SYSTEM FOR RUNNING CABLES

CROSS-REFERENCE TO RELATED APPLICATIONS

The present Application is a national stage of International Patent Application No. PCT/IT2010/000377, titled "Anti-Kinking Transmission and Guiding System for Running Cables," filed Aug. 31, 2010, which claims priority from Italian Patent Application No. TO2009A000706, filed Sep. 16, 2009, the contents of which are incorporated in this disclosure by reference in their entirety.

BACKGROUND OF THE INVENTION

1. Field of the Invention

The present invention refers to an anti-kinking transmission and guiding system for running cables, in particular for an aeolian system for converting energy through a vertical axis turbine actuated by means of kites.

2. Background Art

Different applications are known in which at least two cables are used, running in an axial direction and employed, for example for the directional control of kites in aeolian systems for converting energy disclosed in TO-A-2006A000491 and EP-A-1672214: in such systems, the flight of kites is controlled by motored winches, each one of which aimed to wind and unwind a respective cable. However, taking into account the peculiar and complex flight trajectories of the above kites, it is necessary to prevent that cables get kinked, mutually rub or get damaged. In order to solve such inconvenience, EP-A-1672214 discloses the use of a mobile base, rotating around a substantially vertical rotation, on which winches are secured.

SUMMARY OF THE INVENTION

Object of the present invention is solving the above prior art problems by providing an alternative anti-kinking transmission and guiding system for running cables, in particular for an aeolian system for converting energy by means of a vertical axis turbine actuated by means of kites, that reduces the risk of kinking for such cables.

The above and other objects and advantages of the invention, as will appear from the following description, are obtained with an anti-kinking transmission and guiding system per running cables as disclosed in claim 1. Preferred embodiments and non-trivial variations of the present invention are the subject matter of the dependent claims.

It will be immediately obvious that numerous variations and modifications (for example related to shape, sizes, arrangements and parts with equivalent functionality) can be made to what is described, without departing from the scope of the invention as appears from the enclosed claims.

BRIEF DESCRIPTION OF THE DRAWINGS

The present invention will be better described by some preferred embodiments thereof, provided as a non-limiting example, with reference to the enclosed drawings, in which:

FIG. 2 shows a side view of the anti-kinking transmission and guiding system of FIG. 1;

FIG. 3 shows a top view of the anti-kinking transmission and guiding system of FIG. 1;

FIG. 4 shows another side view of the anti-kinking transmission and guiding system of FIG. 1;

DETAILED DESCRIPTION OF PREFERRED EMBODIMENTS

Figure 1:
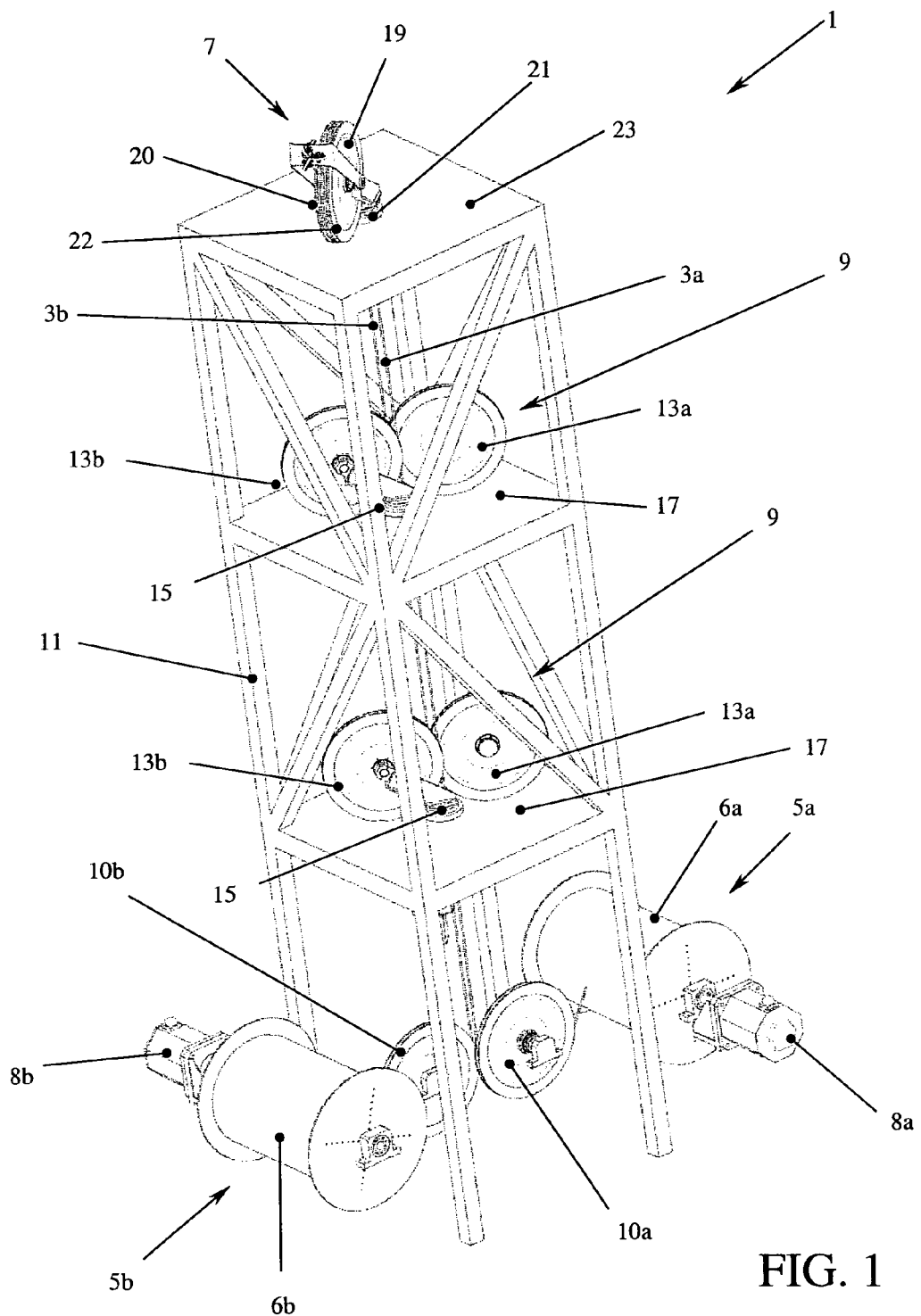
FIG. 1 shows a top perspective view of an embodiment of the anti-kinking transmission and guiding system according to the present invention.

With reference to the Figures, it is possible to note that the anti-kinking transmission and guiding system 1 comprises at least one first and one second cable, respectively 3a e 3b, running mutually parallel along an axis X-X and subtended between a respective winding and unwinding system 5a, 5b and at least one output guiding and transmission assembly 7 of such cables 3a, 3b, between such winding and unwinding system 5a, 5b and such output guiding and transmission assembly 7 being interposed at least one anti-kinking guiding and transmission assembly 9 for such cables 3a, 3b, such anti-kinking guiding and transmission assembly 9 for such cables 3a, 3b and such output guiding and transmission assembly 7 being rotating around such rotation axis X-X, preferably arranged in a substantially vertical position, the rotation of such anti-kinking guiding and transmission assembly 9 around such rotation axis X-X being preferably depending on the rotation of such output guiding and transmission assembly 7 around such rotation axis X-X in order to perform a winding shaped as an helical cylinder of such cables 3a, 3b along such rotation axis (X-X) without contact or rubbing points between the cables 3a, 3b.

In the preferred embodiment of the system 1 according to the present invention shown in the Figures, it is possible to note that advantageously such system 1 comprises two of such anti-kinking guiding and transmission assemblies 9 arranged sequentially along the cables 3a, 3b: obviously, the number of assemblies 9 that can be arranged in the system 1 substantially depends on the length of the cables 3a, 3b interposed between the winding e unwinding 5a, 5b systems and the output guiding and transmission assembly 7.

Obviously, the system 1 according to the present invention further comprises at least one supporting structure 11, preferably made as a tower with trellises, adapted to support the above components of the system 1.

Each winding and unwinding system 5a, 5b, preferably arranged at the base of the supporting structure 11, can be composed of at least one winch, respectively 6a, 6b, driven in rotation by a respective motor 8a, 8b, and can comprise at least one transmission pulley 10a, 10b of the respective cable 3a, 3b from the winch 6a, 6b to the anti-kinking guiding and transmission assemblies 9 and for guiding the winding and unwinding of the cable 3a, 3b from the corresponding winch 6a, 6b.

Each anti-kinking guiding and transmission assembly 9 is preferably composed of at least two pulleys 13a, 13b, one for each cable 3a, 3b, each one of such pulleys 13a, 13b being connected to a base 15 rotating around the rotation axis X-X, such base 15 being obviously connected to a suitable shelf 17 of the supporting structure 11 and preferably equipped with at least one axial opening with respect to such rotation axis X-X (coinciding obviously with a respective opening of the shelf 17) to allow the passage of cables 3a, 3b, the rotation axis of such pulleys 13a, 13b being slanted with respect to the rotation axis X-X by an angle preferably included between 45° and 90°. Advantageously, in order to avoid an excessive bending of the cables 3a, 3b during the guiding and transmission action, and the consequent structural stresses on the cables themselves that would imply their quick wear, each pulley 13a, 13b has a big diameter with respect to the diameter of the respective cable 3a, 3b.

The output guiding and transmission assembly 7 is instead preferably composed of at least one pulley 19 equipped with at least two, side-by-side transmission grooves 20, 22, one for each output cable 3a, 3b, such pulley 19 being connected to a base 21 rotating around the rotation axis X-X, such base 21 being obviously connected to a suitable upper shelf 23 of the supporting structure 11 and also preferably equipped with at least one axial opening with respect to such rotation axis X-X (obviously coinciding with a respective opening of the upper shelf 23) to allow the passage of cables 3a, 3b, the rotation axis of such pulley 19 being orthogonal to the rotation axis X-X itself.

Figures 8A, 8B, 8C:
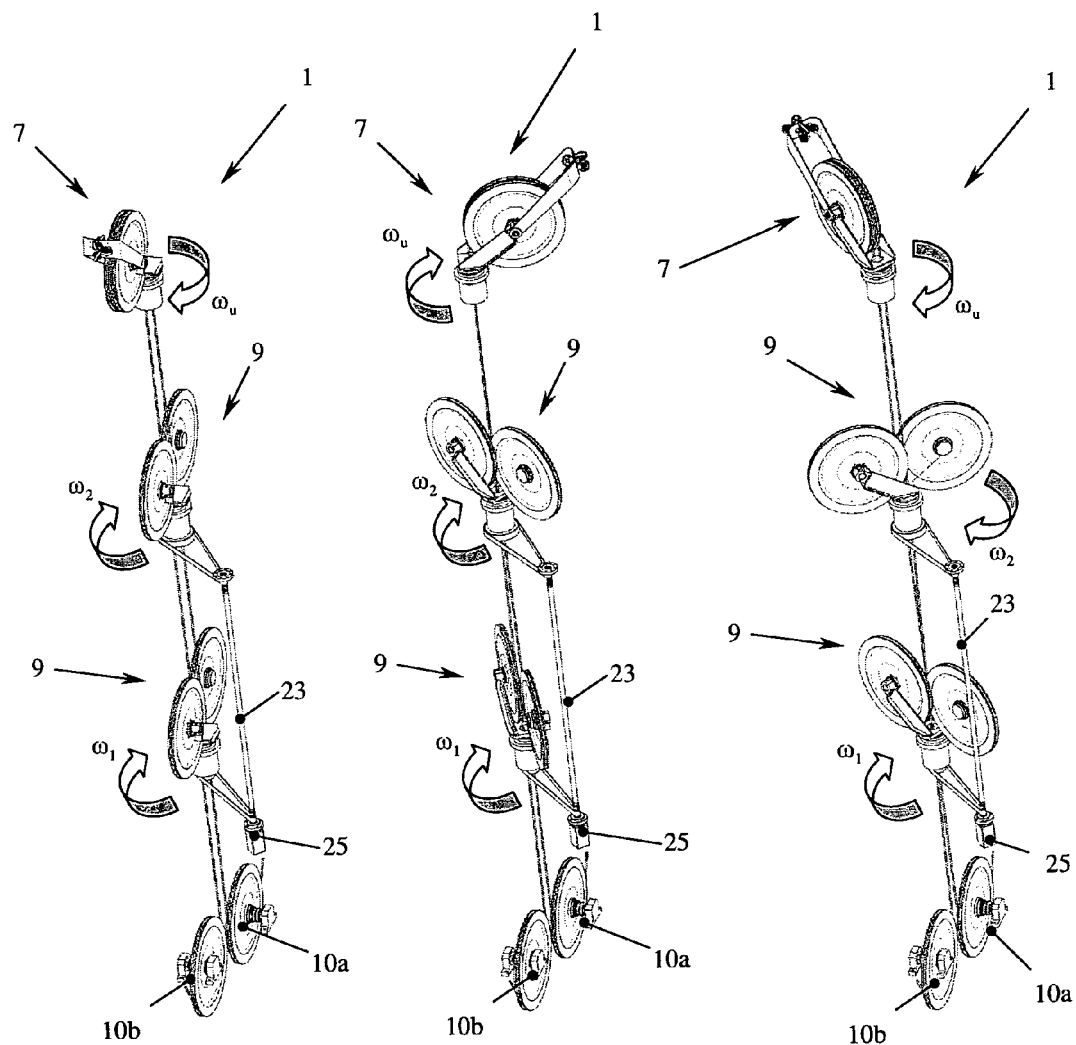
FIGS. 8a, 8b and 8c shows top perspective views of some operating steps of the anti-kinking transmission and guiding system of FIG. 1.

In order to perform the winding shaped as an helical cylinder between the cables 3a, 3b, each anti-kinking guiding and transmission assembly 9 rotates around axis X-X in a coordinate way with respect to possible further assemblies 9 present in the system 1 and, preferably, depending on the rotation around axis X-X of the output guiding and transmission assembly 7 that is determined by the output direction of the cables 3a, 3b imposed by the flight trajectories of the kite connected thereto: obviously, in order to follow the rotation of the output guiding and transmission assembly 7 and, simultaneously, perform the winding shaped as an helical cylinder between the cables 3a, 3b, as can be noted in particular in FIGS. 8a, 8b and 8c, the anti-kinking guiding and transmission assemblies 9 will have to rotate around the rotation axis X-X at angular speeds $\omega_1, \omega_2, \ldots, \omega_n$ that are different and in agreement as direction with fixed ratios $\omega_1/\omega_2 \ldots /\omega_n$, each one of such angular speeds being substantially function of the length and diameter of the cables 3a, 3b, of the distance between each assembly 9 and the output assembly 7 and of the angular rotation speed $\omega_u$ of this latter one. The same lengths of the cables 3a, 3b and the same distance between each assembly 9 and the output assembly 7 define the number of revolutions around the rotation axis X-X on one direction and its opposite direction that the assemblies 9 can perform keeping the cables 3a, 3b separates inside the winding shaped as an helical cylinder: in such a way, the system 1 according to the present invention is able to guarantee a manoeuvre margin of the kites within which the running cables 3a, 3b, though being helically wound, do not mutually show contact points or friction areas.

Figure 5:
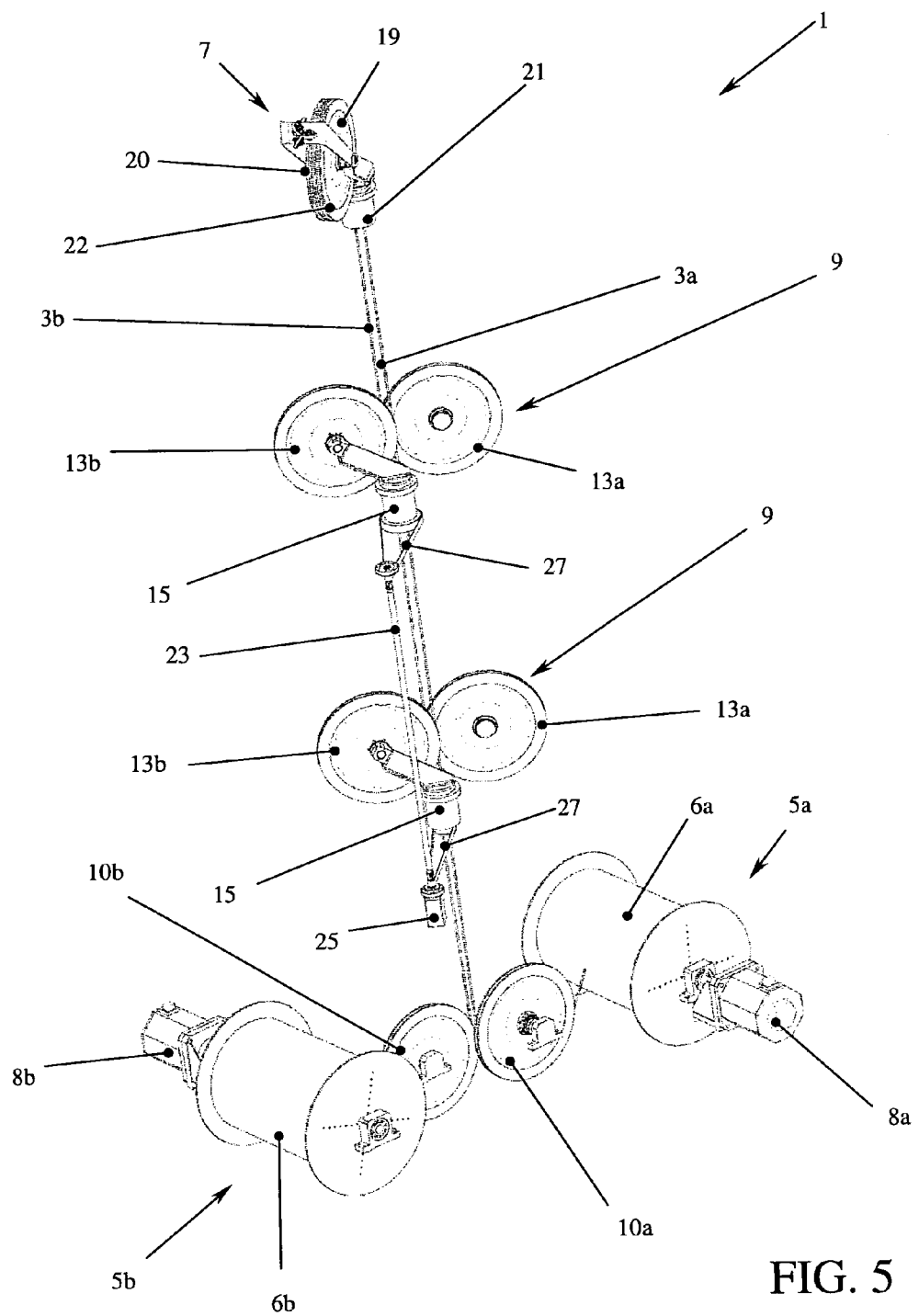
FIG. 5 shows a top perspective view of the anti-kinking transmission and guiding system of FIG. 1 without its supporting structure.

In order to coordinate the rotation speeds $\omega_1, \omega_2, \ldots, \omega_n$ of the individual assemblies 9, these latter ones can be operatively and/or mutually kinematically connected and possibly connected to the output assembly 7. For example, with particular reference to FIG. 5, the anti-kinking guiding and transmission assemblies 9 can be mutually kinematically connected through a single transmission shaft 23 driven in rotation by at least one motor 25, such transmission shaft 23 being connected to each rotating base 15 of every assembly 9 through suitable motion transmitting means, such as for example at least one transmission belt 27, with different transmission ratios in order to define the fixed ratios $\omega_1/\omega_2 \ldots /\omega_n$: in this case, the rotation $\omega_u$ of the output assembly 7 is preferably left free.

Figure 6:
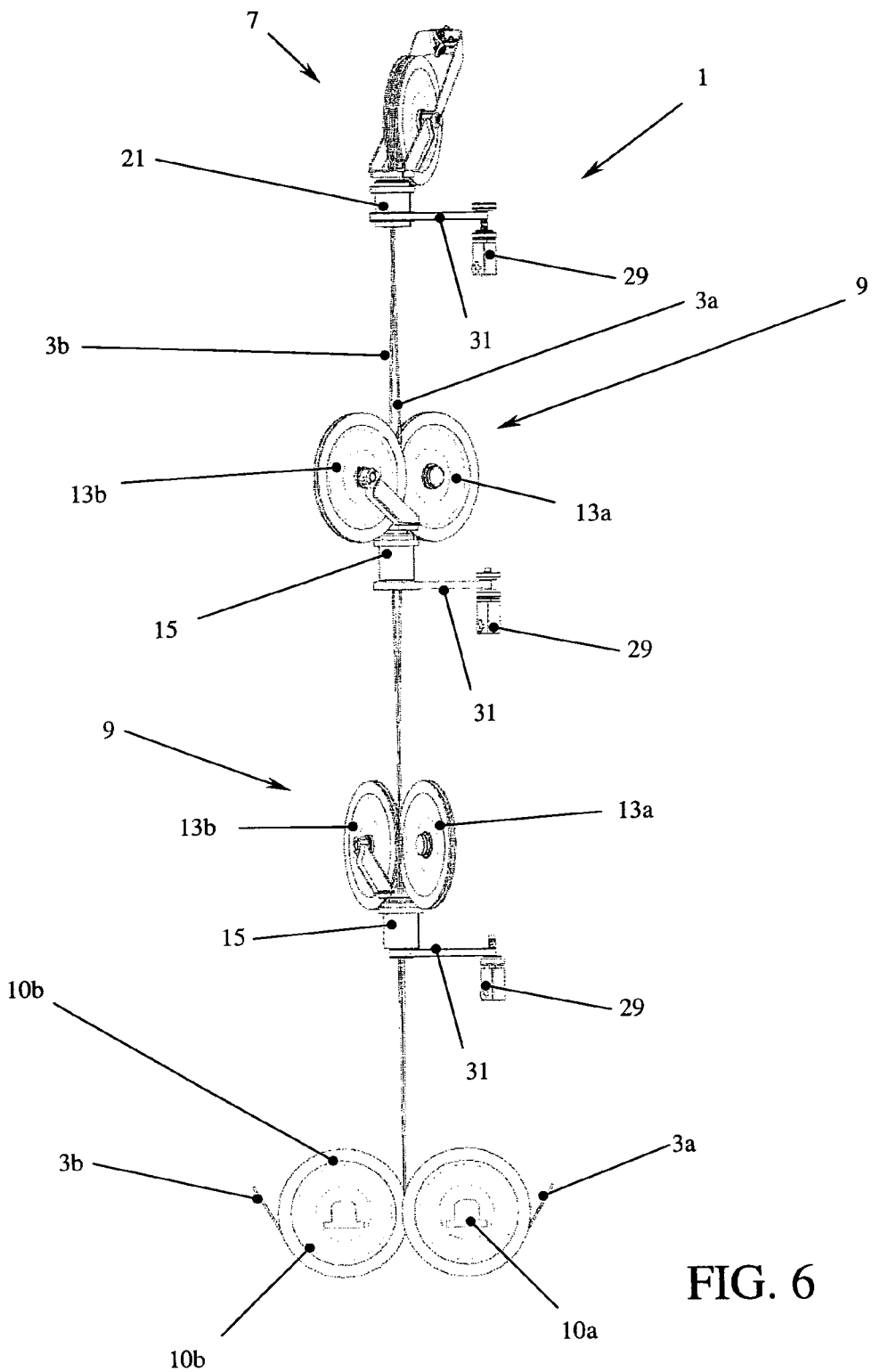
FIG. 6 shows a side view of another preferred embodiment of the anti-kinking transmission and guiding system according to the present invention.

Alternatively, with particular reference to FIG. 6, each anti-kinking guiding and transmission assembly 9 and the output assembly 7 are made rotate by a respective motor 29 connected to the respective rotating base 15, 21 through suitable motion transmitting means, such as for example at least one transmission belt 31, also in this case with different transmission ratios in order to define the fixed ratios $\omega_1/\omega_2 \ldots /\omega_n/\omega_u$.

Figure 7:
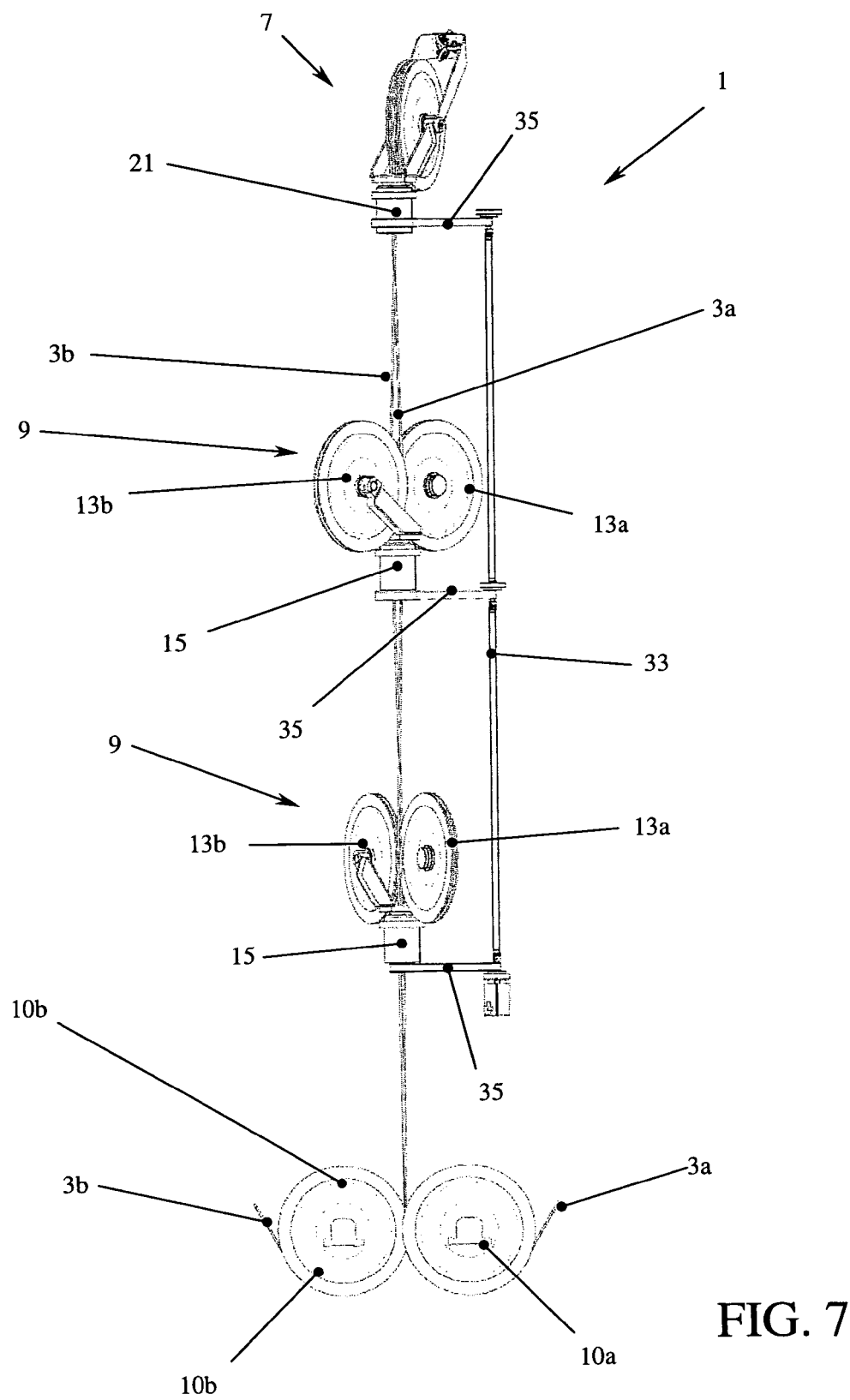
FIG. 7 shows a side view of a further preferred embodiment of the anti-kinking transmission and guiding system according to the present invention.

As further alternative, with particular reference to FIG. 7, the anti-kinking guiding and transmission assemblies 9 and the output assembly 7 can be mutually kinematically connected through a single transmission shaft 33 driven in rotation by the rotation $\omega_u$ of the output assembly 7 around the rotation axis X-X, such transmission shaft 33 being connected to each rotating base 15, 21 of every assembly 9 and of the output assembly 7 through suitable motion transmitting means, such as for example at least one transmission belt 35, with different transmission ratios in order to define the fixed ratios $\omega_1/\omega_2 \ldots /\omega_n/\omega_u$.

Obviously, managing the operation of the system 1 according to the present invention, and in particular of the motors 25, 29, 33 for keeping the fixed ratios $\omega_1/\omega_2 \ldots /\omega_n/\omega_u$ as well as detecting the angular positions of the assemblies 7, 9 can be demanded to suitable electronic control means and sensors, that are substantially known in the art.

The invention claimed is:

1. An anti-kinking transmission and guiding system comprising at least one first and at least one second cable running mutually parallel along a rotation axis and subtended between a respective first and second winding and unwinding systems and at least one output guiding and transmission assembly of the first and second cables, wherein at least one anti-kinking guiding and transmission assembly of the first and second cables is interposed between the first and second winding and unwinding systems and the output guiding and transmission assembly, the anti-kinking guiding and transmission assembly of the first and second cables and the output guiding and transmission assembly rotating around the rotation axis, a rotation of the anti-kinking guiding and transmission assembly around the rotation axis being adapted to perform a winding having a shape of a helical cylinder of the first and second cables without contact or rubbing points between the first and second cables, wherein the anti-kinking guiding and transmission assemblies rotate around the rotation axis at different angular speeds having the same direction and fixed ratios;

wherein the anti-kinking guiding and transmission assembly comprises at least two pulleys, one for each first and second cable, each one of the pulleys being connected to a base rotating around the rotation axis, the base being equipped with at least one axial opening with respect to the rotation axis to allow a passage of the first and second cables, a rotation axis of the pulleys being orthogonal to the rotation axis of the base.

2. The system of claim 1, wherein each one of the first and second winding and unwinding systems comprises at least one respective first and second winch driven in rotation by a respective first and second motor and further comprises at least one first and one second transmission pulley of a respective first and second cable from the first and second winch to the anti-kinking guiding and transmission assembly and for winding and unwinding the first and second cable to and from the first and second winch.

3. The system of claim 1, wherein the output guiding and transmission assembly comprises at least one pulley equipped with at least two, side-by-side transmission grooves, one for each first and second cable, the pulley being connected to a base rotating around the rotation axis, the base being equipped with at least one axial opening with respect to the rotation axis to allow a passage of the first and second cables, a rotation axis of the pulley being orthogonal to the rotation axis.

4. The system of claim 1, further comprising one or more than one additional assembly, wherein each anti-kinking guiding and transmission assembly rotates around the rotation axis in a coordinate way with respect to the one or more than one additional assemblies and depending on a rotation of the output guiding and transmission assembly.

5. The system of claim 1, wherein the anti-kinking guiding and transmission assemblies are mutually kinematically connected through a transmission shaft driven in rotation by at least one motor, the transmission shaft being connected to each base through motion transmitting means with different transmission ratios in order to define the fixed ratios.

6. The system of claim 1, wherein each anti-kinking guiding and transmission assembly and the output assembly are made to rotate by a respective motor connected to a respective rotating base through motion transmitting means with different transmission ratios in order to define the fixed ratios.

7. The system of claim 1, wherein the anti-kinking guiding and transmission assemblies and the output assembly are mutually kinematically connected through a transmission shaft driven in rotation by a rotation of the output assembly around the rotation axis, the transmission shaft being connected to each base through motion transmitting means with different transmission ratios in order to define such fixed ratios.

* * * * *